United States Patent
Stern

(10) Patent No.: US 6,261,083 B1
(45) Date of Patent: Jul. 17, 2001

(54) NOZZLE FOR INJECTION MOLDING

(76) Inventor: Christian R. Stern, Flachsere, CH-3234 Vinelz (CH)

( * ) Notice: Subject to any disclaimer, the term of this patent is extended or adjusted under 35 U.S.C. 154(b) by 0 days.

(21) Appl. No.: 09/302,369

(22) Filed: Apr. 30, 1999

Related U.S. Application Data

(63) Continuation of application No. PCT/CH97/00415, filed on Oct. 31, 1997.

(30) Foreign Application Priority Data

Jan. 11, 1996 (CH) .................................................. 96 2705

(51) Int. Cl.$^7$ ..................................................... B29C 45/20
(52) U.S. Cl. ........................... 425/549; 264/106; 425/810
(58) Field of Search ................... 425/563, 549, 425/810, 572; 264/106, 107

(56) References Cited

U.S. PATENT DOCUMENTS

| | | | | |
|---|---|---|---|---|
| 4,266,723 | * | 5/1981 | Osuna-Diaz | 239/132 |
| 4,279,588 | * | 7/1981 | Gellert | 425/568 |
| 4,318,686 | * | 3/1982 | Morgan | 425/543 |
| 4,427,361 | * | 1/1984 | Saito | 425/549 |
| 4,641,423 | * | 2/1987 | Crandell | 29/611 |
| 4,652,230 | * | 3/1987 | Osuna-Diaz | 425/549 |
| 4,771,164 | * | 9/1988 | Gellert | 425/549 |
| 4,787,836 | * | 11/1988 | Osuna-Diaz et al. | 425/190 |
| 4,900,560 | * | 2/1990 | Trakas | 425/549 |
| 5,268,184 | * | 12/1993 | Gellert | 425/190 |
| 5,324,190 | * | 6/1994 | Frei | 425/563 |

FOREIGN PATENT DOCUMENTS

| | | | |
|---|---|---|---|
| 0051252 | * | 5/1982 | (EP) . |
| 0075043 | * | 3/1983 | (EP) . |
| WO-9208597 | * | 5/1992 | (WO) . |
| WO-9702129 | * | 1/1997 | (WO) . |

OTHER PUBLICATIONS

Rosato et al. Ed., Injection Molding Handbook, Second Edition, Chapman & Hall (c) 1995, p. 143.*
International Preliminary Examination Report Dec. 30, 1998.

* cited by examiner

Primary Examiner—Tim Heitbrink
Assistant Examiner—Emmanuel S. Luk
(74) Attorney, Agent, or Firm—Lacasse & Associates

(57) ABSTRACT

A nozzle for processing of plastics by way of an injection molding machine comprising a basic body (1), a nozzle head (2) and a thermally conducting torpedo (3) which are heated directly or indirectly respectively by a heating device (8). The thermally conducting torpedo (3) is clamped between the basic body (1) and the nozzle head (2). The thermally conducting torpedo (3) is fixed to an adapter (20). The thermally conducting torpedo (3) is arranged such that plastic molding compound is guided to outlets (21.1, 21.2) which are at a distance to a nozzle axis (15). The plastic molding compound is ejected out of the nozzle in e.g. radial outward direction into forming cavities (23.1, 23.2) of an injection mold (17). The nozzle prevents losses of material due to sprue and bore, is simply producible and at the same time guarantees a good heat transmission into the thermally conducting torpedo (3).

8 Claims, 6 Drawing Sheets

NOZZLE FOR INJECTION MOLDING

This is a Continuation of Application No. PCT/CH97/00415, filed Oct. 31, 1997.

In an injection molding machine heated, liquid plastic molding compound is injected through an injection molding nozzle into an injection mold where it cools down and stiffens. Normally the plastic molding compound reaches an entry channel of a mold from a heated nozzle-body via a cylindrical or disc-shaped outlet. The outlet is located on the axis of the nozzle and the flow direction of the plastic molding compound when leaving the nozzle is identical to the axis. The plastic compound is only distributed in the actual forming cavity of the injection mold after it has flowed through the mold entry channel.

Apart from the actual molded part in the forming cavity a sprue in the mold-entry-channel is also formed; this sprue must later be separated from the molded part and removed. Especially with molded parts with a bore, e.g. compact disc carrier discs this sprue has a negative effect on the production process. The removal of the sprue and possibly of a bore necessitates additional production steps. The sprue and possibly the bore lead to unwanted losses of material; even if the material can be processed into plastic granulate and melted this recycling means effort which increases the production cost and the production time.

Due to losses of heat because of thermal conduction, convection and radiation the temperature of the plastic molding compound in the head of the nozzle decreases. In the region of the outlet of the nozzle head the temperature can be considerably lower than in the heated region of the body. This kind of temperature drop in the nozzle is not wanted and can lead to fatal disturbances of the whole course of processing. A first possibility to reduce the decrease in temperature is direct heating of the nozzles. This, however, is connected with further disadvantages: The heating of the thermal sensors required for control and the necessary electric lines and contacts are sensitive to disturbances and require a large amount of space in the dipping region.

A second possibility for reducing the temperature drop in the nozzle is the employment of an indirectly heated thermally conducting torpedo, as is e.g. known from "Technische Kunststoffe C.2.1: Heisskanalsystem indirekt beheizter Wärmeleittorpedo" Ed. Hoechst Aktiengesellschaft, 1982. This kind of thermally conducting torpedo is substantially a bar with a high thermal conductivity immersed in the plastic molding compound in the part of the nozzle which is not heated. It conducts heat from the heated part of the nozzle to the region of the outlet. In many known nozzles the thermally conductive torpedo is bolted to the nozzle body or the nozzle head. The bolted connection has disadvantages: it does not guarantee an optimal heat transmission into the thermally conducting torpedo and its production is complicated and costly. Publications U.S. Pat. Nos. 4,787,836, 4,266,723 and 4,652,230 avoid this problem by clamping the thermally conducting torpedo in-between base and nozzle head. Admittedly, this kind of thermally conducting torpedo so far seemed unsuitable for molding of flat molded parts with bore.

A further possibility for reducing the temperature decrease in the nozzle is to attach a temperature-equalization-element around part of the nozzle which is not heated. This kind of temperature equalizing element reduces the temperature drop by means of heat conduction, heat isolation and/or heat reflection. It can be employed in combination with a thermally conducting torpedo. An example for this is revealed in publication WO 97/02129.

In publication WO 92/08597 an injection mold for injection molding of disc shaped molded parts is revealed which comprises a first and a second part; These two parts define a disc-shaped cavity together and can be shifted relatively to each other. A third cylindrical part protrudes through the disc-shaped cavity in order to define a hole in the center of the part to be molded. The third part consists of a core and a jacket between which a cylindrical channel for feeding of molding compound is located. The core is equipped with electrical heating means on its inside. The injection mold has different disadvantages. Firstly, the heating means require a lot of space such that the thickness of the core cannot be smaller than a determined size. This means that only discs with relatively large central holes can be molded. Secondly, the heating means in the core need a gauge in order to be able to supply the required temperatures which makes operation complicated and sensitive to disturbance. Thirdly, it is not guaranteed that the heat reaches the molded part from the heating means. Fourthly, the production of the mold according to WO 92/08597 with its many parts to be matched is complicated and costly.

The invention now has the object to develop a nozzle for injection molding of disc-shaped molded parts which does not have the above disadvantages, i.e. especially has thermal characteristics, is more simple to be assembled and simpler and more robust in operation. This object is solved by the nozzle and the method as it is defined in the independent claim.

In the inventive nozzle, one or several outlets in the nozzle head are arranged at a distance to the axis of the nozzle. The outlets must not necessarily be disc-shaped but can have other geometrical forms of cross section; they can e.g. be designed as lengthy slots, the length of which is a multiple of their height. The direction of flow of the plastic molding compound when leaving the nozzle must not necessarily be identical with the direction of the axis of the nozzle but can e.g. be at a right angle to the nozzle axis.

For guidance of the plastic molding compound to at least one outlet, it is advantageous to provide an adapter at the end of the nozzle. The adapter is e.g. fastened to the torpedo. The thermally conducting torpedo is, according to the invention, merely clamped in-between the nozzle body and the nozzle head. The nozzle thus is assembled by inserting the thermally conducting torpedo into the body and by clamping or pressing it with slight initial tension respectively into position in the nozzle body by means of bolting the nozzle head down. This kind of press fit is simple to produce and, moreover, guarantees a very good heat transmission into the thermally conductive torpedo and through the thermally conductive torpedo into the adapter or to the at least one outlet respectively. The manufacture of the inventive nozzle is considerably more simple than and less costly than the manufacture of known nozzles. The inventive nozzle is thermally advantageous as well as mechanically.

In the inventive method the plastic molding compound is ejected out of the nozzle through at least one outlet at a distance from the nozzle axis into an injection mold. After injection of the plastic molding compound into the injection mold the molded part is separated from the plastic molding compound in the nozzle head in a still warm condition, by means of shifting the nozzle and the injection mold in relation to each other. This shifting substantially takes place in parallel to the area of the nozzle outlet.

A further advantage of the invention is that the molded parts can be produced in an almost unlimited variety of forms, whereby losses due to sprue and bore are prevented. Examples for parts produced according to the inventive method and/or with the inventive nozzle are plates with bores, especially compact disc carrier discs, hollow structures such as tubes, cups or funnels and also plates without bores, e.g. credit card carrier plates.

BRIEF DESCRIPTION OF THE DRAWINGS

The invention is described in more detail in connection with the following diagrammatic figures, whereby.

DETAILED DESCRIPTION OF THE INVENTION

Figure 1:
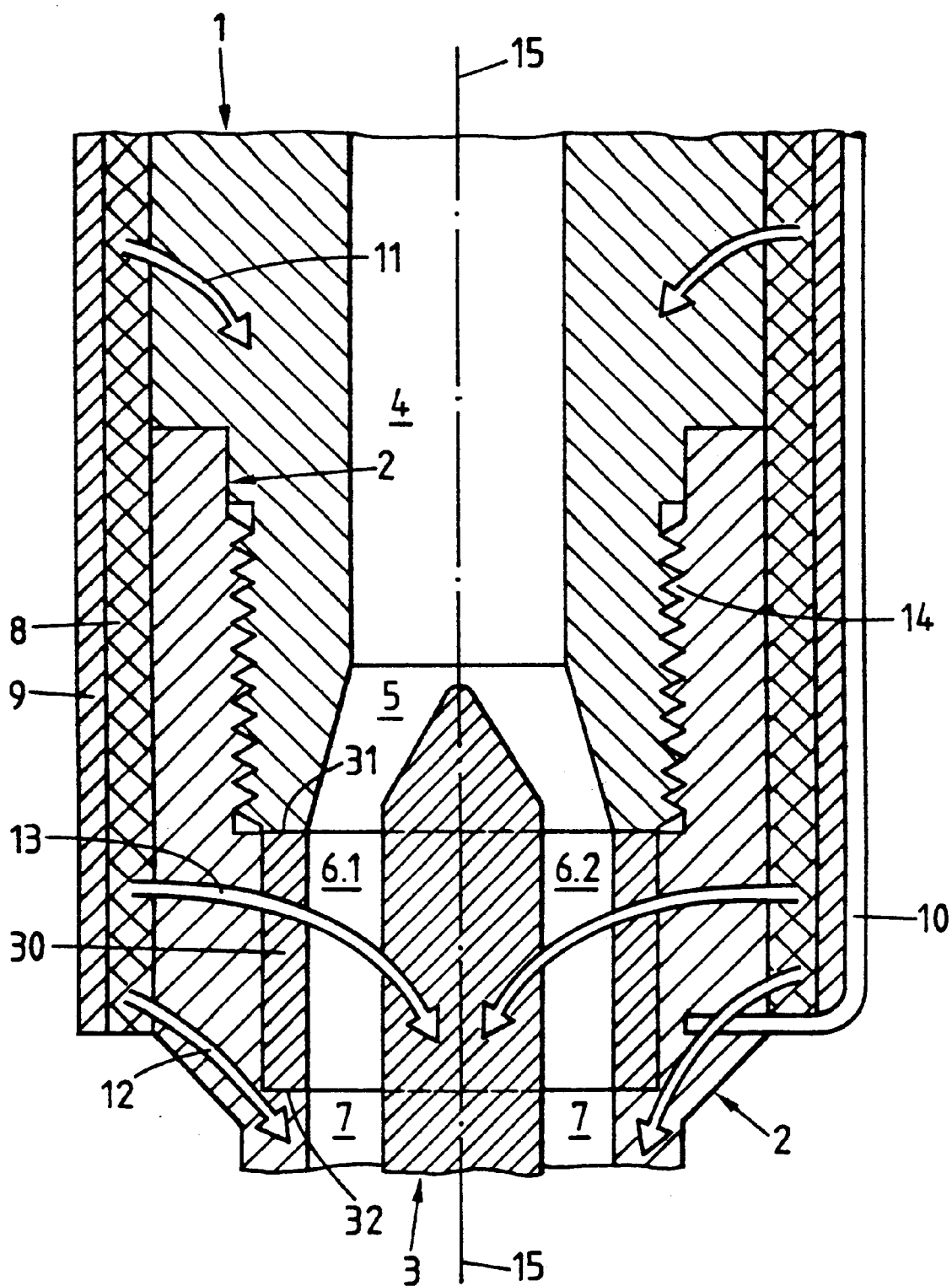
FIG. 1 shows a longitudinal section through a basic form of an inventive injection molding nozzle with a thermally conducting torpedo.

FIG. 1 shows a basic form of the inventive injection molding nozzle with a base 1, a nozzle head 2 and a thermally conducting torpedo 3. This basic form is employed for the examples of embodiments discussed in the following Figures. It guarantees a mechanically and thermally advantageous arrangement of the nozzle head 2 and the thermally conductive torpedo 3.

Plastic molding compound reaches a ring-shaped gap 7 through a channel 4 in the base 1 in a nozzle head antechamber 5 and further through at least one passage 6.1, 6.2 in the thermally conducting torpedo 3. A heating means 8 heats the base 1 directly, indicated by means of arrows 11, and nozzle head 2 directly, indicated with arrows 12, and the thermally conducting torpedo indirectly, indicated with arrows 13. The nozzle head 2 is advantageously thermally conductive but can also be thermally isolating and/or reflective in order to keep the temperature drop in the nozzle head 2 slight. The heating means 8 can be surrounded by a tube 9 for improvement of the thermal characteristics. In the nozzle head or in a different location of the nozzle a thermal sensor 10 for temperature measurement can be attached.

The nozzle head 2 is advantageously bolted down by means of a thread in the base 1. The thermally conducting torpedo 3 is advantageously clamped in-between the base 1 and the nozzle head 2. For this purpose it e.g. comprises an enlargement 30; the base 1 presses onto an upper shoulder 32 of the enlargement 30, nozzle head 2 presses onto the enlargement 30 with a counter force by which the thermally conducting torpedo 3 is held. The clamping of the thermally conducting torpedo 3 according to the invention is a simple as well as mechanically advantageous manner of fixation. The press fit guarantees an optimal heat transmission from the heating means 8 through the nozzle head 2 into the thermally conducting torpedo 3 and through this to the outlet (not shown in FIG. 1) of the nozzle. The lengthwise orientation of the nozzle defines a nozzle axis 15.

Figure 2:
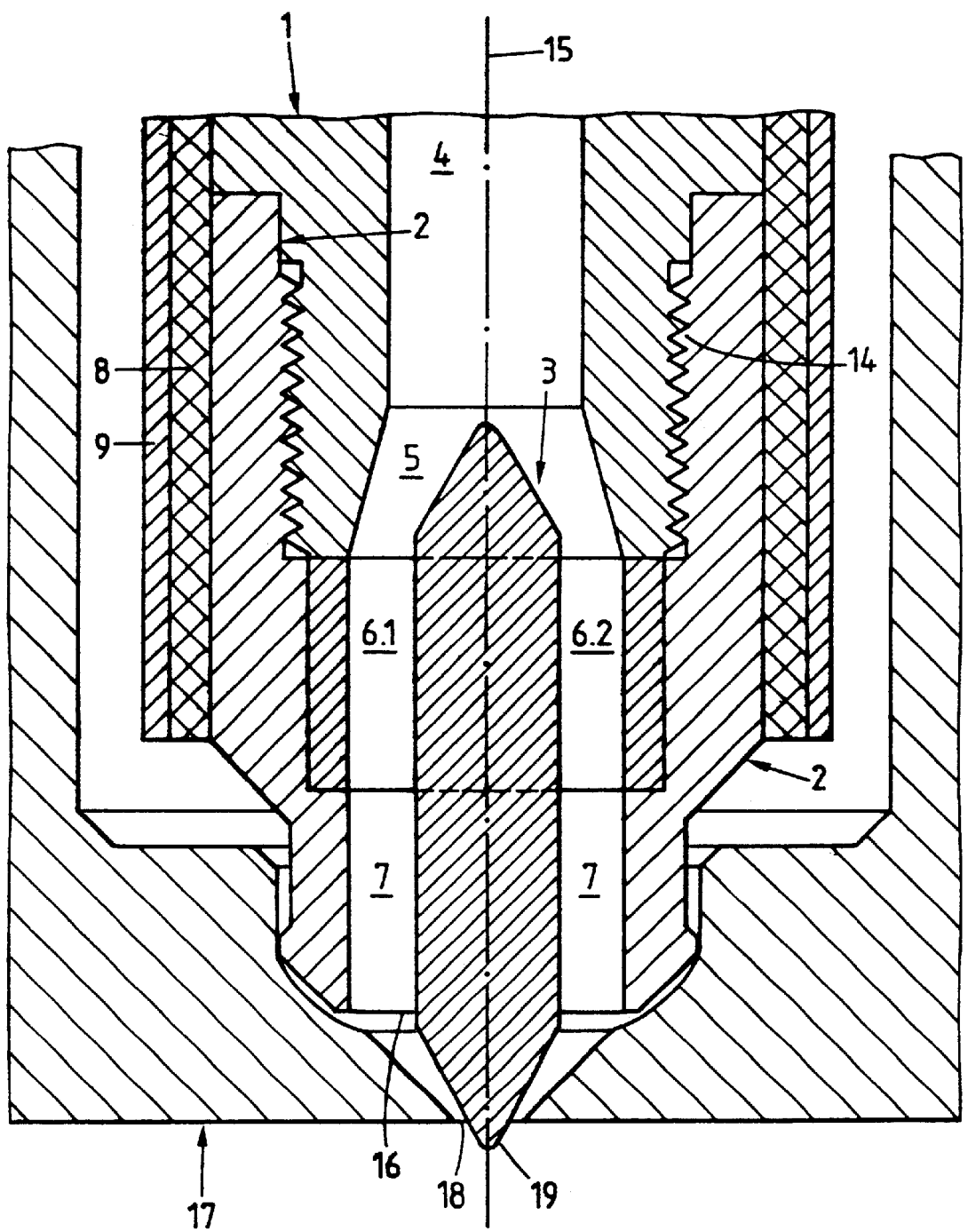
FIG. 2 shows a longitudinal section through an embodiment of the inventive injection molding nozzle with a thermally conducting torpedo.

FIG. 2 shows an embodiment of the inventive nozzles with a thermally conducting torpedo 2. The plastic molding compound is guided through a ring-shaped gap 7 to an outlet 16 of the nozzle in the region of the nozzle axis 15. The nozzle is embedded with a notch 18 out of which the plastic molding compound leaves the nozzle. Behind the notch 18 a forming cavity is located which is not shown here. The head 19 of the torpedo can protrude slightly from the notch 18.

Figure 3:
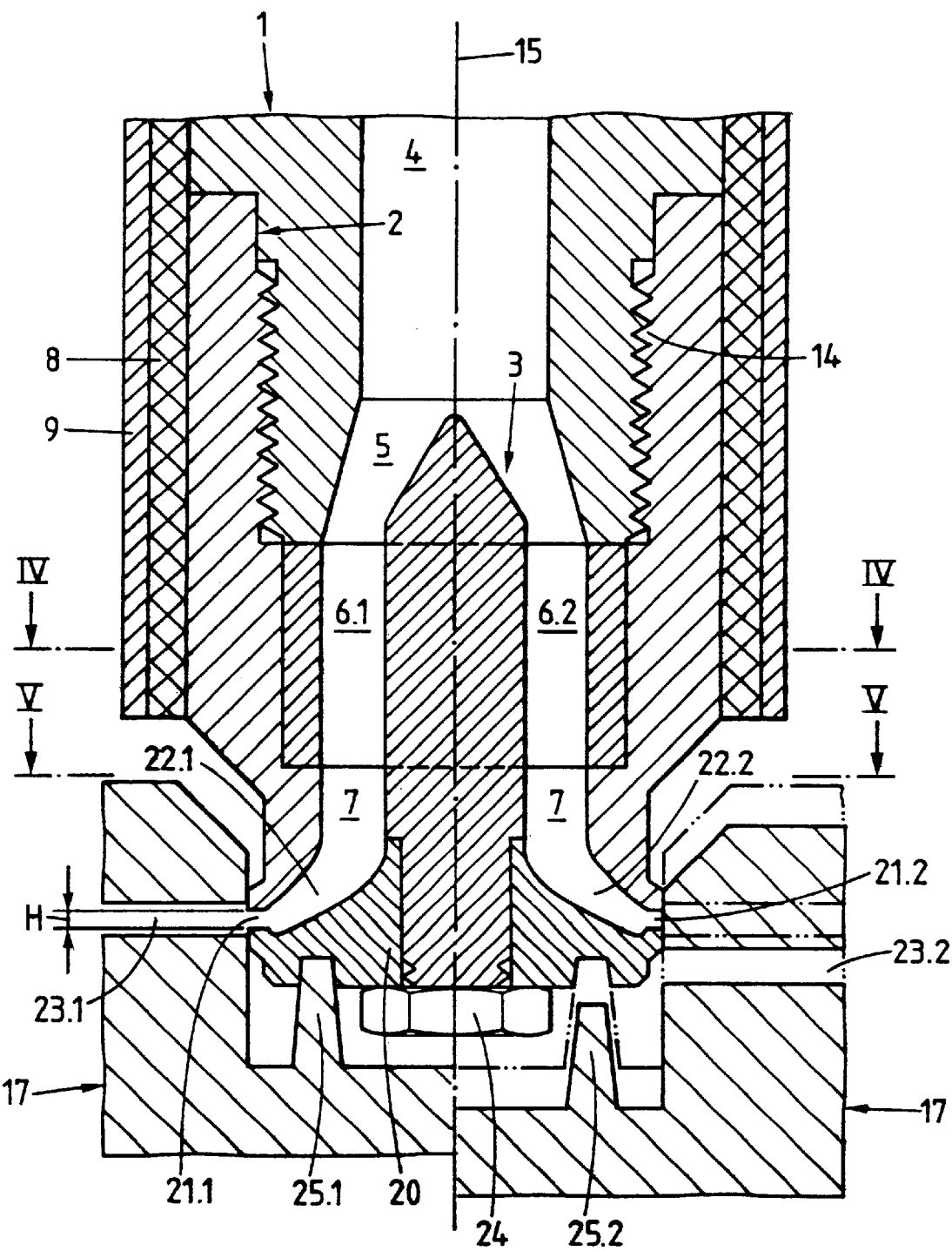
FIG. 3 shows a longitudinal section through an embodiment of the inventive injection molding nozzle with an adapter.

In a different embodiment of the inventive nozzle the basic form of FIG. 1 is used in order to attach an adapter, the first embodiment of which is shown in FIG. 3. Here the position of the nozzle when injecting into the injection mold 17 can be seen on the left side of the nozzle axis 15 and on its right side the position of the nozzle after its separation of a molded part can be seen. The adapter 20 takes the place of the torpedo head 19 of FIG. 2; the nozzle head 2 is matched to the adapter such. The adapter 20 and the end of the nozzle head 2 are shaped such that they form one or several outlets 21.1, 21.2 of a height H at a distance to the nozzle axis through which the plastic molding compound leaves the nozzle head 2. One or several channels 22.1, 22.2 in the nozzle head redirect the plastic molding compound such that its flow direction is at a right angle to the nozzle axis 15 when leaving the nozzle. This means that in this exemplified embodiment the plastic molding compound is injected radially outwards into at least one forming cavity 23.1, 23.2 in the injection mold 17, as shown in the left half of FIG. 3.

The adapter 20 is fixed to thermally conducting torpedo 3 e.g. with a bolt 24 or with other fixation means. In order for the adapter to withstand the high injection pressures it is advantageous to support it by means of at least one supporting means 25.1, 25.2 against injection mold 17. The supporting means 25.1, 25.2 also precisely define the final position of the nozzle head 2 concerning the injection mold 17.

After conclusion of the injection molding process the slightly cooled out and rigid molded part is separated from the hot and liquid plastic molding compound in the nozzle head 2 by means of a relative shifting between the nozzle and the injection mold 17. This shifting advantageously happens in parallel to the area of the at least one outlet 21.1, 21.2, in the example in FIG. 3, in parallel to the nozzle axis 15.

Figure 4:
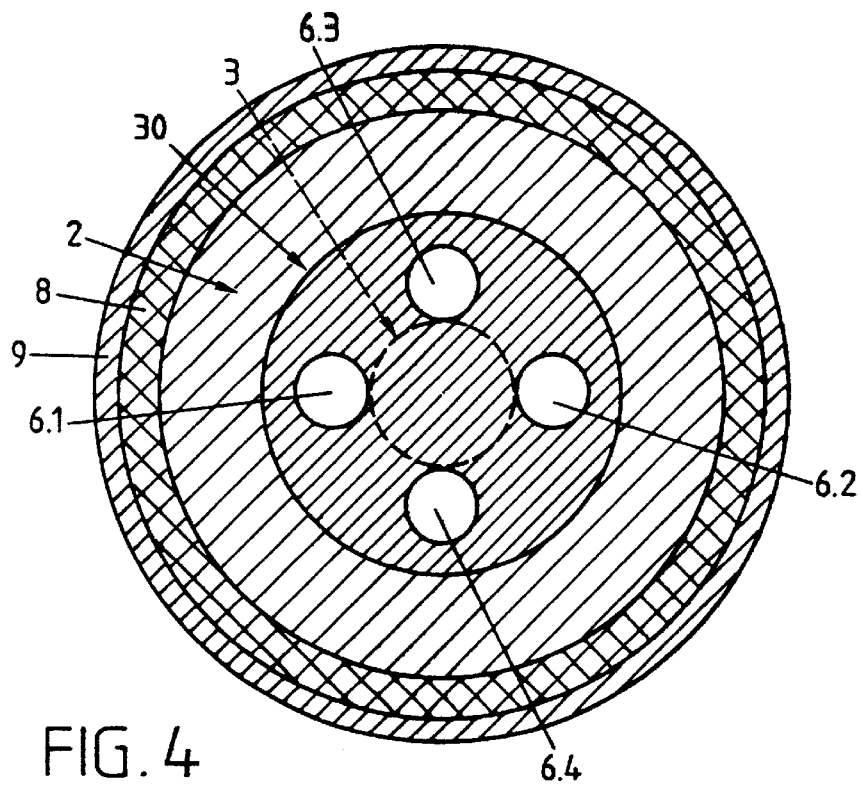
FIGS. 4 and 5 show cross sections through the injection molding nozzle of FIG. 3 and FIGS. 6 and 7 show longitudinal sections through further embodiments of the inventive injection molding nozzle.

FIG. 4 shows a cross section through the nozzle of FIG. 3 in the location marked IV—IV. In the middle the thermally conducting torpedo 3 is located. The thermally conducting torpedo comprises the enlargement in the location of the cross section of FIG. 4 in which enlargement the passages 6.1–6.4 run. In FIG. 4 e.g. four passages 6.1–6.4 are shown; the number of passages can, however, also be a different one. Further outwards in FIG. 4 the nozzle head 2, the heating means 8 and the tube 9 are visible.

Figure 5:
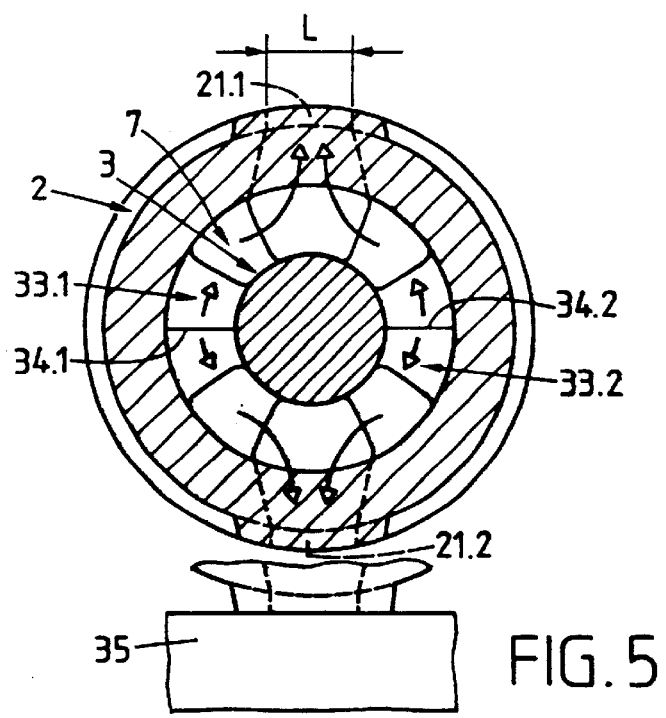

FIG. 5 shows a cross section through the nozzle of FIG. 3 in the location marked V—V. The nozzle in this exemplified embodiment has two outlets 21.1, 21.2. In the ring-shaped gap 7 the plastic molding compound, the flow direction of which is indicated with arrows, is, e.g. by means of wedge-shaped separation walls 33.1, 33.2 with a ridge 34.1, 34.2 each, distributed to the two outlets 21.1, 21.2. The outlets 21.1, 21.2 are designed as lengthy slots, i.e. their length L is a multiple of their height H (see FIG. 3). This embodiment is suitable for flat molded parts 35, e.g. credit cards.

The nozzle head 2 shown in FIG. 3 can also be equipped with one single outlet which extends over the whole circumference of the nozzle. Hereby the circumference of the nozzle is larger by a multiple than the height H of the outlet. This embodiment is especially suitable for the production of flat molded parts with bore, such as compact disc carrier discs.

Figure 6:
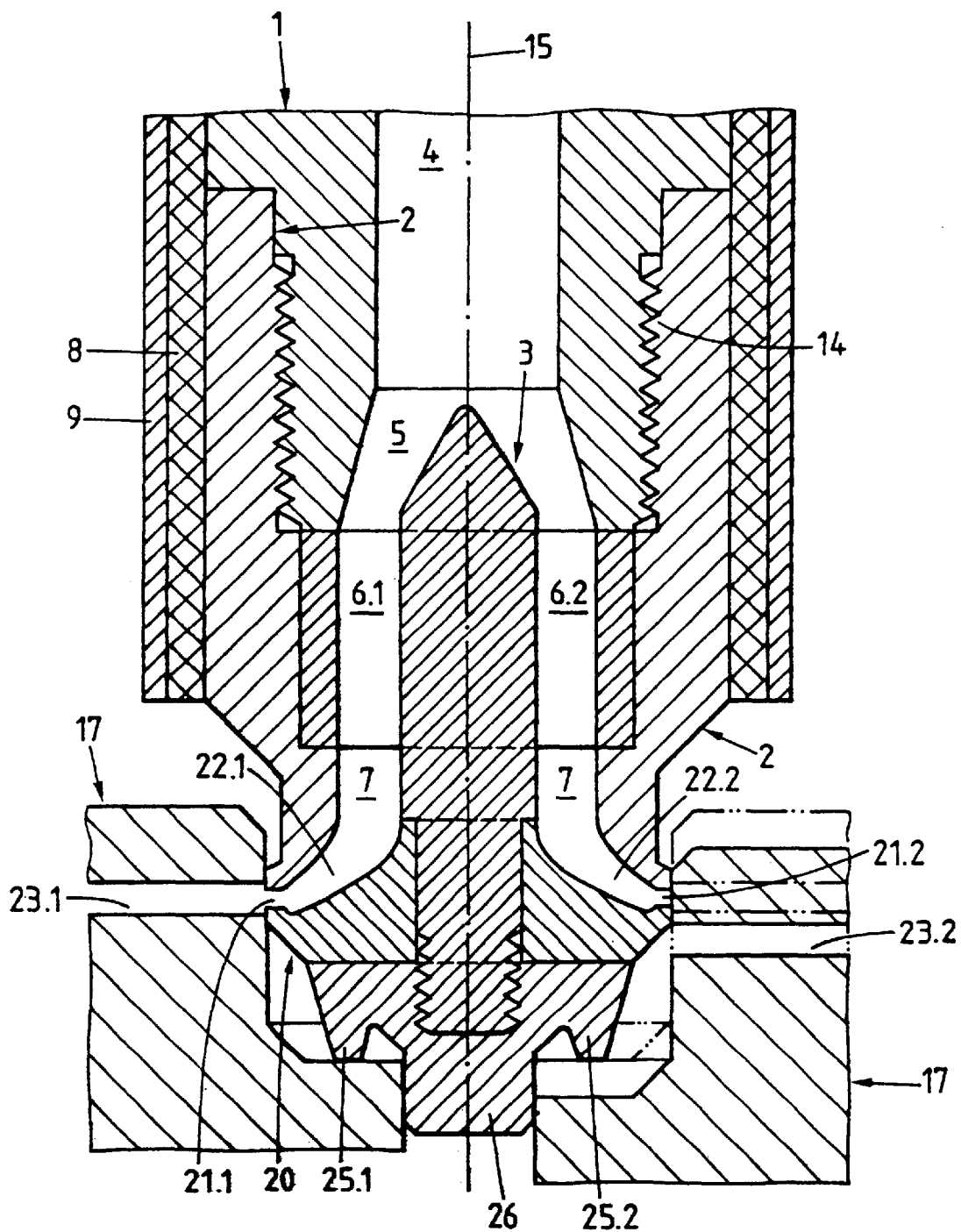

FIG. 6 shows, in the same manner of representation as FIG. 3, a second embodiment of the inventive nozzle. Here, as opposed to the embodiment of FIG. 3 the supporting means 25.1, 25.2 are attached to the adapter 20. The adapter 20 is equipped with a straight guidance 26 for the straight separation movement in parallel to nozzle axis 15 which is guided in the injection mold 17.

Figure 7:
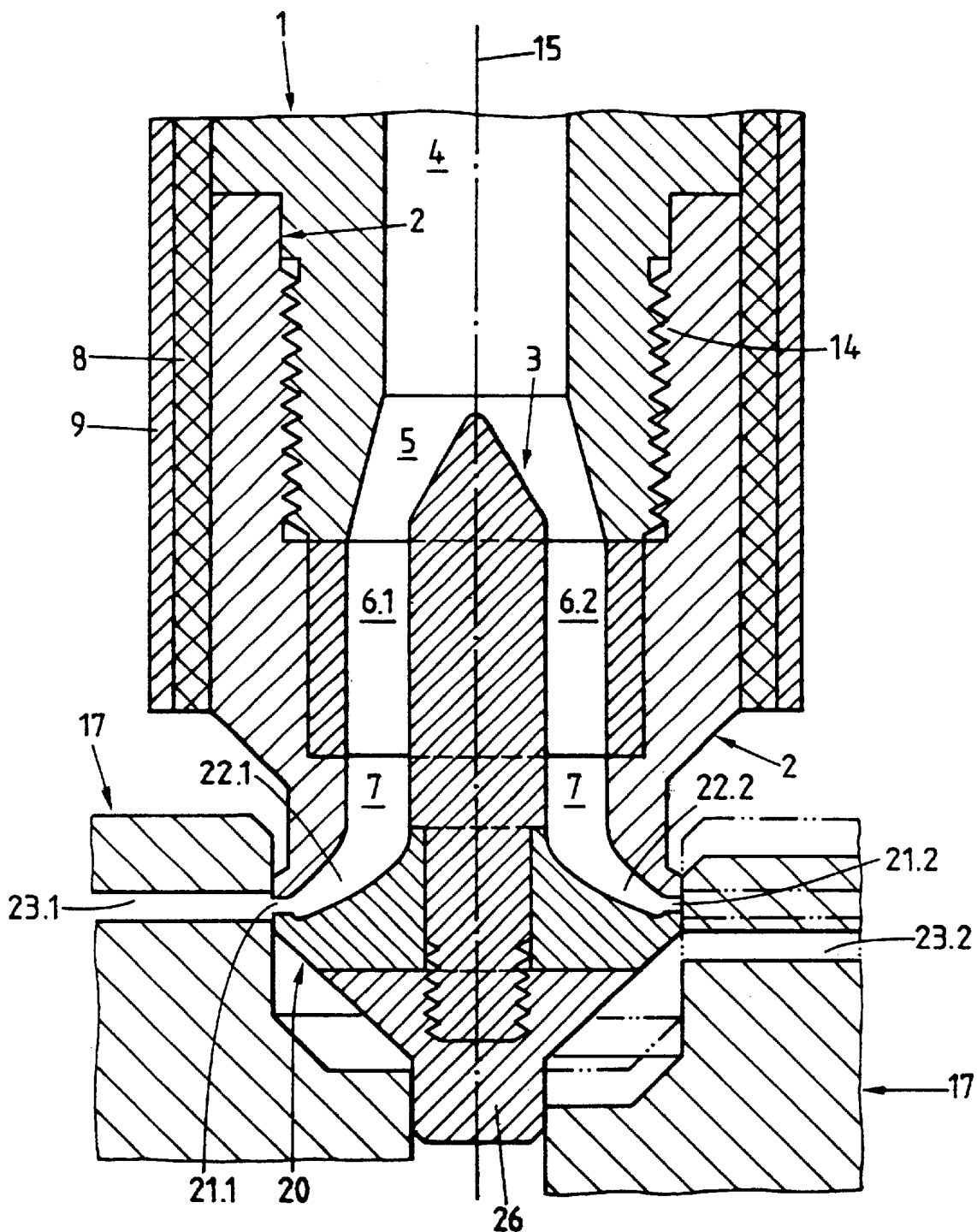

In FIG. 7 a third embodiment of the inventive nozzle is shown in analogy to FIGS. 3 and 6.

What is claimed is:

1. A nozzle for the processing of plastics by means of injection molding into a cavity to form a molded part, comprising:

a basic body;

a nozzle head mounted on said basic body;

a central channel in said basic body and said nozzle head for guiding a plastic molding compound, the lengthwise orientation of said central channel defining a nozzle axis;

at least one opening acting as an outlet for said plastic molding compound arranged such that the plastic molding compound is injected radially outwards into said forming cavity in the injection mold;

a thermally conducting torpedo clamped between said basic body and said nozzle head;

means for guiding said plastic molding compound from said central channel to said at least one opening, said guiding means being reversibly mounted on said thermally conducting torpedo; and a heating means arranged at said nozzle head for directly heating said nozzle head and indirectly heating said thermally conducting torpedo;

wherein said nozzle in total is movable with relation to said forming cavity.

2. A nozzle according to claim 1, wherein said at least one opening is formed between said nozzle head and said guiding means.

3. A nozzle according to claim 1, wherein said at least one opening is designed to be a lengthy slot the length of which is a multiple of its height.

4. A nozzle according to claim 3, wherein said opening extends over the whole circumference of the nozzle.

5. A nozzle according to claim 1, wherein said at least one opening is arranged such that the flow direction of said plastic molding compound through said at least one opening is at a right angle to the direction of said nozzle axis.

6. A nozzle according to claim 1, additionally comprising at least one supporting means for supporting said guiding means against an injection mold.

7. A nozzle according to claim 1, wherein said nozzle head is bolted onto said basic body.

8. A nozzle according to claim 1, wherein said thermally conducting torpedo comprises an enlargement having an upper and a lower shoulder, and said basic body presses onto said upper shoulder and said nozzle head presses onto said lower shoulder, thus holding said thermally conducting torpedo.

* * * * *